United States Patent [19]
Larson et al.

[11] Patent Number: 5,253,735
[45] Date of Patent: Oct. 19, 1993

[54] APPARATUS TO SENSE AND ANNUNCIATE TRUCK BRAKE CONDITION

[76] Inventors: Reese G. Larson, S. 506 Leta St., Spokane, Wash. 99216; John V. Boes, E. 14806 Rockwell Ave., Spokane, Wash. 99207

[21] Appl. No.: 951,822

[22] Filed: Sep. 28, 1992

[51] Int. Cl.⁵ ............................................. F16D 66/02
[52] U.S. Cl. ................................ 188/1.11; 192/30 W; 324/207.2; 324/207.26; 340/454; 340/549
[58] Field of Search .................... 188/1.11; 192/30 W; 340/454, 549; 324/207.2, 207.26

[56] References Cited

U.S. PATENT DOCUMENTS

| | | |
|---|---|---|
| 3,356,188 | 12/1967 | Goldman et al. |
| 3,628,008 | 12/1971 | Lacey . |
| 3,722,629 | 3/1973 | Totschnig . |
| 3,776,329 | 12/1973 | Hope et al. ................ 340/454 X |
| 3,943,486 | 3/1976 | Hayashida et al. . |
| 4,013,143 | 3/1977 | Juhasz . |
| 4,279,214 | 7/1981 | Thorn . |
| 4,800,991 | 1/1989 | Miller . |
| 4,905,800 | 3/1990 | Mathews . |
| 5,157,329 | 10/1992 | Brauer ...................... 324/207.2 X |

Primary Examiner—George E. A. Halvosa
Attorney, Agent, or Firm—Keith S. Bergman

[57] ABSTRACT

Three adjacent disks carried by an "S" cam shaft of a truck brake system sense motion of system components beyond predetermined limits to indicate need for adjustment and parts replacement and annunciate such information at a distance from the brake system. A first outer disk journaled on the "S" cam shaft is interconnected to the slack adjuster arm to rotate responsive to motion of the slack adjuster arm. A second medial disk journaled on the "S" cam shaft is supported by external structure to remain stationary relative to that shaft. A third outer disk is irrotatably carried by the "S" cam shaft to rotate with it. The second medial disk carries two Hall effect switches to sense the rotary position of magnets carried in the first and third adjacent outer disks to determine motion of the slack adjuster arm and the "S" cam shaft beyond predetermined limits to indicate need for brake adjustment and brake shoe replacement. Sensed data is transmitted to an annunciator at a distance from the braking system. Separate sensing and annunciating systems are provided for each braking system of a truck-tractor and associated trailers.

3 Claims, 3 Drawing Sheets

APPARATUS TO SENSE AND ANNUNCIATE TRUCK BRAKE CONDITION

BACKGROUND OF INVENTION

RELATED APPLICATIONS

There are no applications related hereto heretofore filed in this or any foreign country by any of the instant inventors.

FIELD OF INVENTION

This invention relates generally to wheeled vehicle braking systems, and more particularly to apparatus to sense the condition of an "S" cam type truck braking system and annunciates sensed data at a distance from that braking system.

DESCRIPTION OF PRIOR ART

The braking systems in transport trucks have parts that wear and are expendable and by reason of this such braking systems require continuous surveillance for proper maintenance. Unfortunately many braking systems, and especially the portions that are expendable, are concealed or difficult of inspection and some require at least partial dismantling to learn of their condition. Inspection procedures are inconvenient and time consuming and consequently brake system maintenance is often neglected to create substantial safety hazards.

By far the greatest number of transport vehicle accidents that are caused by vehicular equipment are caused in some fashion by braking systems. Responsively, various sensing systems have heretofore become known to sense and sometimes annunciate brake condition, but no such systems have effectively resolved all of the associated problems. The instant invention provides a new, novel and improved member of this class of device.

Most over-the-road truck transport units of the present day are of a compound type with a truck-tractor propelling one or more trailers with each unit having one or more wheel trucks carrying opposed sets of wheels. It is generally required for proper truck operation and by various regulatory pronouncements that each wheel or set of wheels on one axle end must have its own independent braking system so that any transport unit has at least four braking systems and the number may range upwardly to twelve or more such systems. Almost universally truck braking systems have standardized drum-type brakes with two arcuate shoe arms pivotally carried at first adjacent ends inside a brake drum for expansion against the inner surface of the drum to cause frictional braking action. The shoe arms are expanded by an "S" cam that is rotated between second adjacent ends of the opposed arms to cause both shoe arms to move radially outwardly in substantially similar fashion. Our invention is associated with the shaft carrying the "S" cam to measure both the rotary motion of that shaft and angular motion of the associated slack adjuster arm to determine need for adjustment and brake shoe wear.

Most modern pneumatic braking systems have a diaphragm type canister that applies motive force to a slack adjuster arm that in turn rotates the "S" cam shaft for braking. A valve operated by the brake pedal releases compressed air to the canister to move the diaphragm. By the nature of this system, unlike hydraulic systems common in automobiles, little if any indication of brake condition is given to an operator. The pneumatic canister that applies braking force is limited in its stroke and because of this component wear, primarily of the brake shoes, can progress to the point that the canister stroke is not enough to apply adequate force to the brakes. Because of the high mechanical advantage built into the system to provide larger motion of the air canister diaphragm that is translated to a smaller motion of the brake shoes, the wear condition is not well indicated to an operator by brake function.

To promote safety through proper brake system maintenance, regulatory agencies have established limits for travel allowable for canister rods beyond which adjustments are required. Unfortunately, component variations, lack of standard measuring equipment and methods, and lack or proper enforcement often leave doubt as to whether brake systems are in compliance.

Various devices have heretofore become known to sense motion parameters of braking systems to determine system condition. The most common parameter measured has been the movement of a cylinder or diaphragm which ultimately moves the brake shoe arms. Other devices have sensed the thickness of brake shoe lining, commonly by sensing the distance between a brake shoe arm and the associated brake drum, but also in some instances by sensing exposure of the inner surface of a brake shoe lining. At least one prior device has sensed the angular motion of the slack adjuster arm that rotates the "S" cam shaft to indicate brake shoe lining wear. Some of these sensing devices have annunciated the sensed condition at a distance from the brake structure, but none have provided distant annunciation combined with sensing the angular position of an "S" cam shaft.

Most known brake condition sensors have been concerned with the state of brake shoe linings, though the amount of "throw" or motion required to actuate the braking system is generally of substantially equal importance. "S" cam activated braking systems generally may be adjusted by a slack adjustment mechanism which changes the angular position of the "S" cam shaft at which rotary motion is first applied to move that shaft. This allows a brake system to be adjusted to accommodate wear of both the brake shoe lining and of the "S" cam and its contacting pins, thereby staying within the limits of motion of the linkage. If slack adjustment is not properly made, the air canister rod stroke may not be sufficient to properly operate the braking system and if shoe wear is great the "S" cam can even rotate off brake shoe contact pins to cause a braking system to become inoperative.

The need for slack adjustment in the past has generally been determined by loss or delay of braking action, by disassembly and inspection of the braking system, or by measurement of canister rod extension. Our sensing system in contradistinction provides sensing apparatus to dynamically determine slack in the brake system exceeding a predetermined amount and to annunciate this condition at a distance from the braking system. The system also accommodates changes in the amount of slack and the angular position at which braking is initiated to allow and account for adjustments in a brake system.

Known devices that sense and annunciate brake condition generally have annunciated the results of their sensations only in the immediate vicinity of the brake system itself. This limits the utility of such devices as brake systems are located in positions that are difficult of access and accessible only when a truck is not moving. Our system provides remote annunciation at any time at positions distant from the brake system being sensed. This is accomplished either by direct wire communication or by an aerial type communication such as radio. The system provides annunciators for each of a plurality of individual braking systems in a truck-trailer unit and may be conveniently located in the cab of a truck. An annunciating system may also be used spacedly distant from a truck such as by regulators, law enforcement agent, and the like when checking braking systems of a truck for regulatory compliance.

Our invention lies not in anyone of these features per se, but rather in the synergistic combination of all of the structures of our device that necessarily give rise to the functions flowing therefrom as herein set forth and claimed.

SUMMARY OF INVENTION

Our invention provides a system to sense excessive wear of parts and excessive slack in "S" cam type braking systems and annunciate the sensed conditioned at a distance from the brake system.

We provide three adjacent relatively pivotal disks that are carried by the "S" cam shaft. The first outer disk is journaled on the "S" cam shaft and interconnected with the slack adjuster arm to rotate responsive to rotary motion of the slack adjuster arm. The second sequentially adjacent medial disk is journaled on the "S" cam shaft and supported by brake structure to remain stationary relative to the vehicle "S" cam shaft. The third sequentially adjacent outer disk is irrotatably carried by the "S" cam shaft. The first and third disks carry magnets that each operatively communicate with one of two Hall effect switches carried by the second medial disk to activate those switches when the angular motion of the first or third disks moves the magnets carried thereby into adjacency with the associated Hall switches to indicate excessive slack and excessive brake shoe wear respectively. The Hall effect switches communicate electrically with an annunciator at a spaced distance from the brake system to annunciate the existence or non-existence of switch operation. A plurality of annunciators may be associated to indicate at a single location the condition of all brake system sensors on a truck and trailer unit.

In providing such apparatus it is:

A principal object to sense the rotation of the "S" cam shaft and slack adjuster arm of a truck brake system relative to adustable predetermined limits to indicate need for brake shoe lining replacement and slack adjustment.

A further object is to provide annunciations of the sensed conditions at a distance from the brake system, commonly either in the cab of a service truck or spacedly adjacent to the truck.

A further object is to provide annunciation at a single location of the conditions of a plurality of brake systems in a truck and trailer unit.

A still further object is to provide such apparatus that may be attached to most "S" cam type braking systems in presently existing trucks and trailers.

A still further object is to provide such apparatus that is of new and novel design, of rugged and durable nature, of simple and economic manufacture and otherwise well adapted to the uses and purposes for which it is intended.

Other and further objects of our invention will appear from the following specification and accompanying drawings which form a part hereof. In carrying out the objects of our invention, however, it is to be remembered that its accidental features are susceptible of change in design and structural arrangement, with only one preferred and practical embodiment of the best known mode of our invention being specified and illustrated in the accompanying drawings as is required.

BRIEF DESCRIPTION OF DRAWINGS

In the accompanying drawings which form a part hereof and wherein like numbers of reference refer to similar parts throughout.

DESCRIPTION OF THE PREFERRED EMBODIMENT

Our invention generally provides sensing apparatus 11 associated with truck brake system 10 to sense the system condition and transmit sensed information to annunciator 12 at a spaced distance from the brake system.

Figure 1:
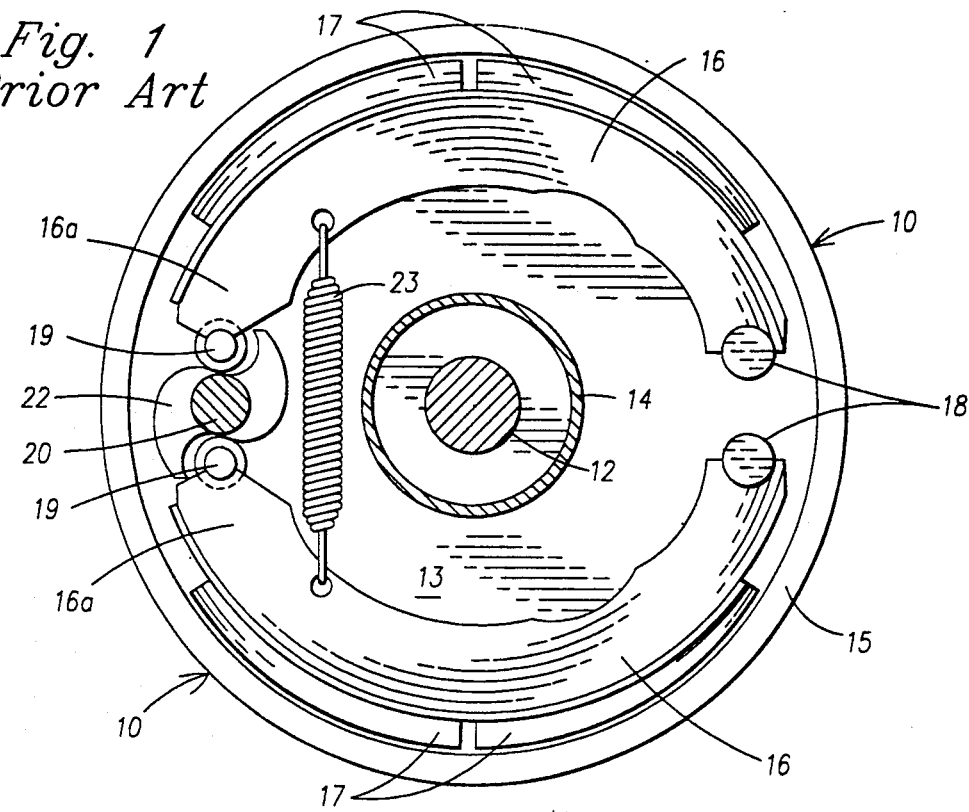
FIG. 1 is an orthographic, outwardly looking elevational view of a typical brake drum with brake shoes and activating "S" cam structure in position therein, but with the slack adjuster mechanism removed, to show the general type of braking system with which our invention is operable.
Figure 3:
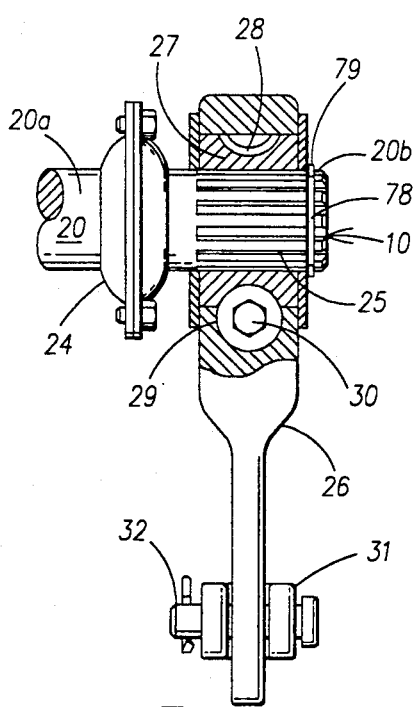
FIG. 3 is a partially cut-away orthographic side view of the interconnecting structure of FIG. 2 showing the same structure from this aspect.
Figure 2:
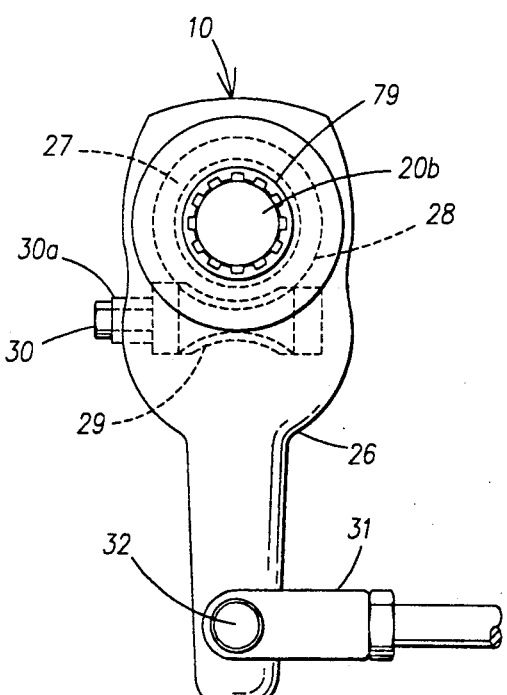
FIG. 2 is an orthographic end view of the interconnection of an "S" cam shaft with a slack adjuster arm showing the adjustment linkage in dashed outline.

A typical "S" cam type truck braking system is shown in FIGS. 1, 2 and 3 where it is seen to include brake drum disk 13, with perpendicularly extending peripheral cylindrical rim 15, attached to axle housing 14 and axle shaft 12. Two similar paired, symmetrically opposed brake shoe arms 16 carrying radially outwardly extending arcuate brake shoes 17 are carried on pins 18 within rim 15 for pivotal motion toward and away from the rim. The adjacent movable ends 16a of the brake shoe arms carry perpendicularly extending "S" cam pins 19 so positioned that the pins 19 will be spacedly adjacent to allow operative positioning of "S" cam 22 therebetween. The "S" cam shaft 20 is carried in support bearing 24 which in turn is supported on axle housing 14 by bracket 21 to extend a spaced distance (within the brake drum disk). "S" cam shaft 20 irrotatably carries "S" cam 22, commonly formed as a unitary structure with the "S" cam shaft. The "S" cam is of the particular shape for which it was named, as illustrated in FIG. 1, so that as the cam rotates in a clockwise direction in the instance illustrated in FIG. 1, it will simultaneously move adjacent "S" cam pins 19 radially outwardly to move brake shoes 17 into frictional contact with the inner surface of drum rim 15 to cause frictional braking action. The two brake shoes are maintained in a biased non-braking position by extension spring 23 communicating between the two end portions 16a.

The end portion 20b of the "S" cam shaft extending from the brake drum is supported in bearing 24 carried by the frame of a vehicle and defines end spline 25 in its outermost portion. The splined end portion of the "S" cam shaft irrotatably carries slack adjuster arm 26 extending radially therefrom and axially maintained thereon by keeper ring 79. The slack adjuster arm rotatably carries annular adjustment collar 27, which on its radially inner surface interfits with spline 25 to provide an irrotatable interconnection and on its radially outer surface defines worm gear 28 about its periphery. Adjustment collar 27 is rotatably carried by the slack adjustment arm to cooperatively contact spiral worm 29 to regulate the angular positioning of the adjustment collar relative to the slack adjustment arm. The spiral worm 29 provides adjustment shaft 30 having a nut-like end extending from the slack adjuster arm to allow adjustment of rotary positioning of these elements to adjust the brake system for slack caused by wear of parts, especially the brake lining, the "S" cam and the "S" cam pins, by moving the angular position at which force is first applied to the "S" cam shaft. Spring loaded locking collar 30a keeps adjusting screw 30 and spiral worm 29 from accidentally turning once setting is correct.

In this braking system, rotary motion is provided to the "S" cam shaft by angular motion of the slack adjuster arm 26 responsive to substantially linear force applied to the radial outer end thereof through clevis 31 and clevis pin 32 by a pneumatic or hydraulic canister 77 which ultimately is operated by a brake pedal in the cab of a truck. Commonly the fluid operating system is of a fail-safe type which causes motion of clevis 31 responsive to lowered pressure in the fluid operating system, so that if the pressure system fails, the brake system assumes a braking mode. Such braking systems, in the essence described at least, are common in most present day transport trucks and trailers of commerce and have become reasonably standardized substantially in the form as illustrated and described. Similar systems may be used with other wheeled land vehicles, and especially those running on rails. It is with such brake systems that our invention is operative.

Figure 4:
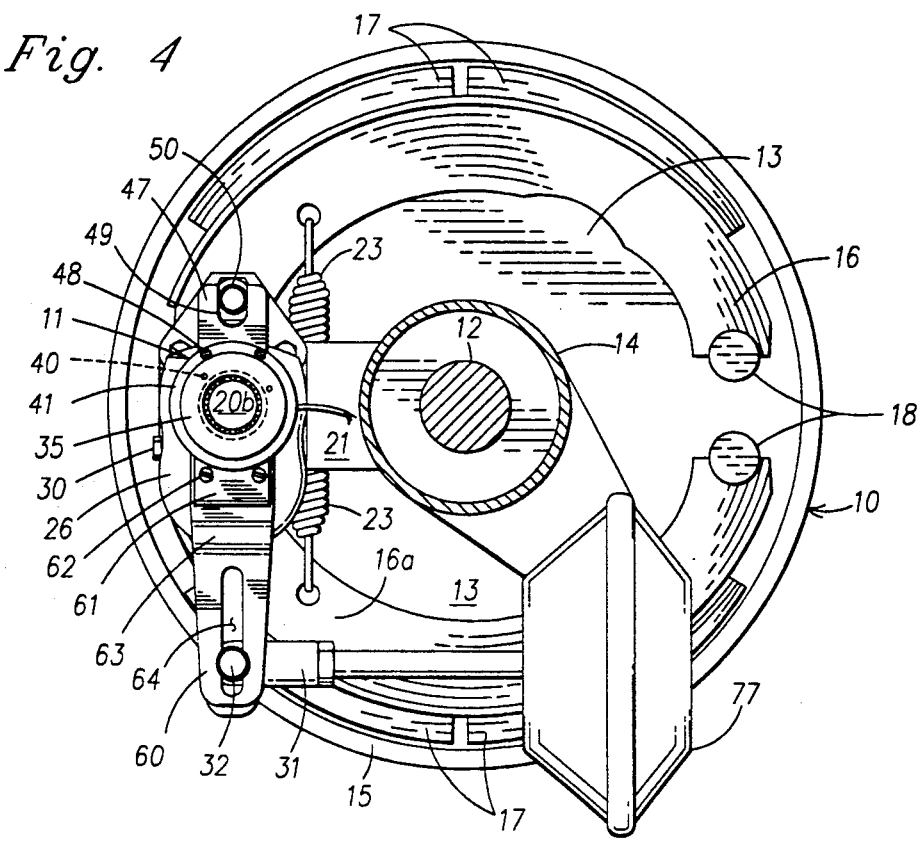
FIG. 4 is a view similar to that of FIG. 1, but with the slack adjuster mechanism and our sensor apparatus in place on the system.

Our invention is illustrated especially in FIGS. 4 et seq., of the drawings. Sensing apparatus 11 provides a structure carried on the outer splined end portion 20b of "S" cam shaft 20 and extends radially therefrom.

Sensing apparatus 11 provides sleeve-like cylindrical body 33 defining medial channel 34 to fit over and fasten upon the outer splined end portion 20b of "S" cam shaft 20. The body 33 extends a spaced distance from the "S" cam shaft and defines in its outer end portion annular, radially outwardly extending cam shaft measuring disk 35. Body 33 is releasably maintained in irrotatable engagement on the outer end portion of the "S" cam shaft by split ring clamp 36 that extends about the inner end portion of the body. The split ring clamp defines a bore having an inner diameter substantially the same as the outer diameter of the adjacent portion of the body 33. The clamp 36 is defined by two similar semi-circular portions interconnected by threadedly engaged bolts 37 which may be tightened to frictionally engage body 33 upon the end portion of "S" cam shaft. Body 33 defines plural spaced slots 42 extending spacedly from its inner end to create resilience to allow clamping onto end portion 20b of the "S" cam shaft. Clamp 36 provides a radially inwardly extending keeper ring 58 that engages keeper ring groove 78 to provide secure attachment to splined end 20b of the "S" cam shaft.

The radially outer portion of body 33 axially inward of measuring disk 35 defines disk bearing surface 38 to journal annular sensing disks. The inner "S" cam facing surface of measuring disk 35 defines an appropriate annular groove to carry "O" ring 39 of circular cross-section which serves as a dirt and moisture barrier. A small permanent magnet 40 is carried in an appropriately defined hole in the same inner surface of disk 35, radially inwardly from "O" ring 39, to allow sensation of the radial position of that disk as hereinafter specified.

Annular sensor disk 41 is journaled on bearing surface 38 immediately inwardly toward the "S" cam shaft from cam shaft measuring disk 35. Sensor disk 41 is of greater external diameter than cam shaft measuring disk 35 to allow fastening of yoke 47. The radially inner portion of sensor disk 41 carries two Hall effect switches 43, 114 in appropriate holes defined in each side of the disk at a radial position similar to that of magnet 40 carried by disk 35 so that the Hall effect switch and magnet that are adjacent each other may rotate into coincidence. Channel 45 is defined in the sensor disk 41 to extend from each of the Hall effect switches outward through the circumferential periphery of the disk to provide a channel for electrical circuitry 46 extending between annunciator 12 and the Hall effect switches 43, 44.

The annular sensor disk 41 is positionally maintained relative to "S" cam shaft by yoke 47 carried by the outer rim portion of disk 41 by means of bolts 48 threadedly engaged between these elements. Yoke 47 defines slot 49 to receive rod 50 which carries adjacent nuts 51 engaged on the threaded opposite end portion to fasten that end portion of the rod in support arm 52 supported on bearing 24 by bolts 53 extending in threaded engagement between these elements. This arrangement of elements provides an adjustable support system that may be attached to existing brake systems with the rest of sensing apparatus 11 to maintain annular sensor disk 41 in a fixed position relative to the "S" cam shaft of that brake system.

Slack adjuster arm disk 54 defines bore 55 for journaling upon disk bearing surface 38 of body 33. The main body of disk 54 is of substantially the same radial size as that of cam shaft measuring disk 35. On its inner side proximate to the "S" cam, adjustment arm disk 54 defines radially extending adjustment annulus 56 defining annular adjustment groove 57 in its outwardly facing surface. The planar surface of slack adjuster arm disk 54 that is adjacent to sensor disk 41 defines an appropriate groove to carry annular "O" ring 58a and the surface defining bore 55 defines a similar annular groove to carry "O" ring 59 to serve as dirt and moisture barriers.

Figure 6:
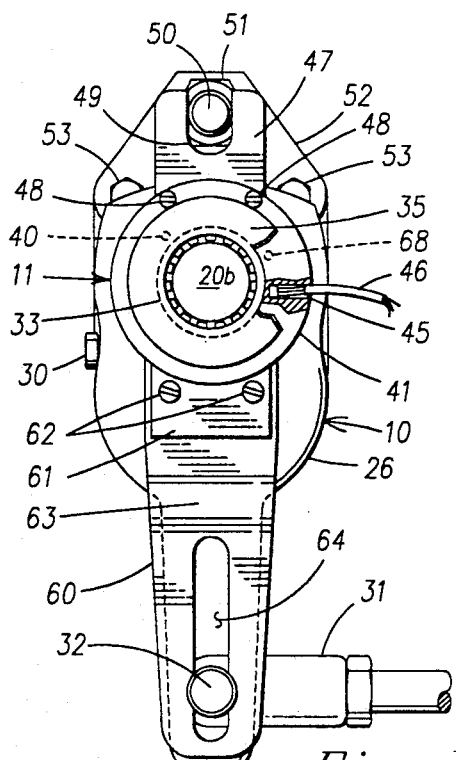
FIG. 6 is a partial cut-away orthographic elevational view of the left side of the structure illustrated in FIG. 5.
Figure 5:
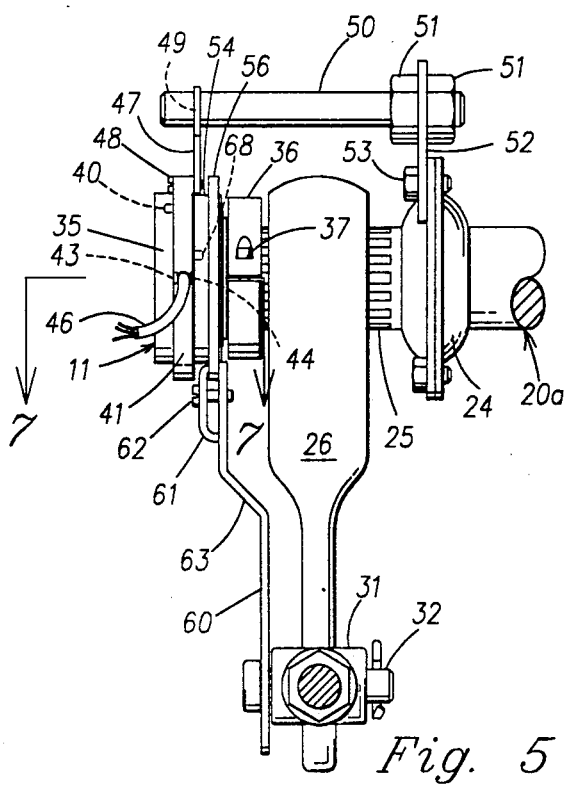
FIG. 5 is an orthographic side or elevational view of a part of the "S" cam shaft and slack adjuster structure shown in FIG. 3 with our apparatus in place thereon.
Figure 7:
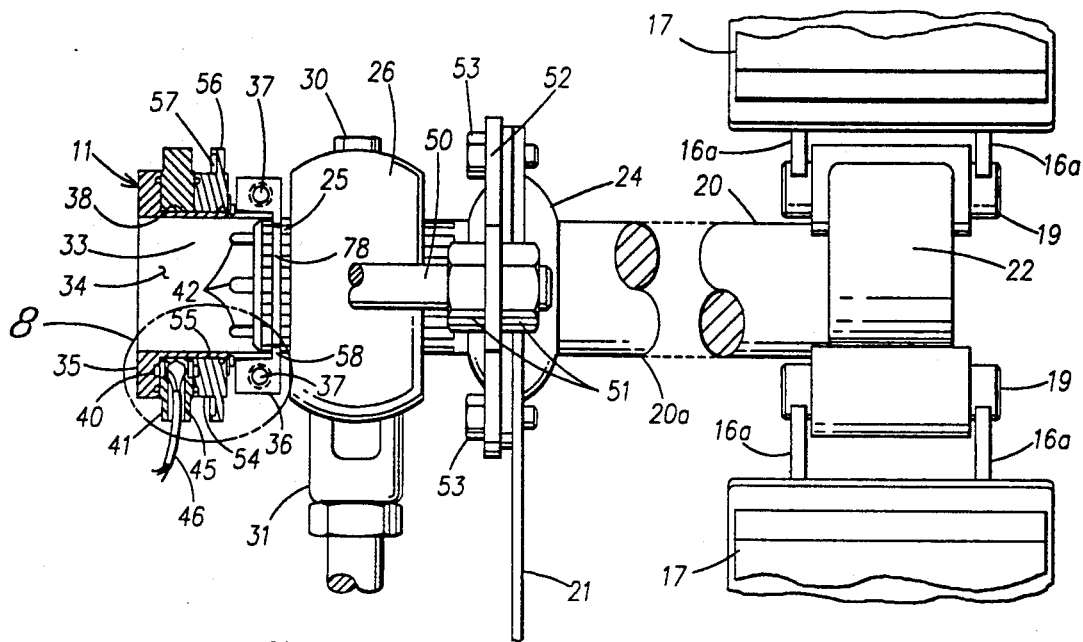
FIG. 7 is a somewhat enlarged, partial horizontal cross-sectional view through the structure of FIG. 5, taken on the line 7—7 thereto in the direction indicated by the arrows thereon, with the associated "S" cam structure included.
Figure 8:
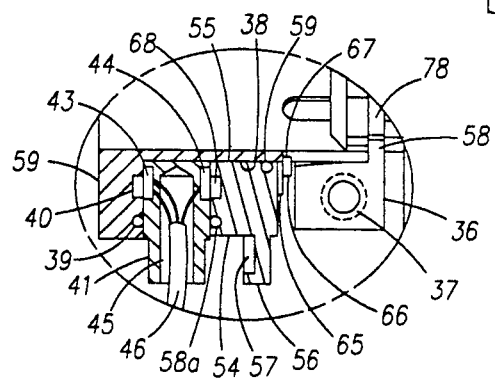
FIG. 8 is an enlarged portion of FIG. 7 shown within the dashed ellipse 8 on FIG. 7.

Slack adjuster connector arm 60 extends radially outwardly from releasably adjustable interconnection with slack adjuster arm disk 54 to communicate with the linkage driving the slack adjuster arm 26 to translate the arcuate motion of that arm into responsive motion of the slack adjuster arm disk 54. The slack adjuster connector arm 60 is releasably interconnected to adjustment annulus 56 by asymmetrical "U" shaped clamp 61 having bolts 62 extending therethrough and into threaded engagement with the connector arm 60, as illustrated especially in FIGS. 5 and 6. The adjustment arm extends across the inner "S" cam facing surface of adjustment annulus 56 and the radially inner arm of fastening clamp 61 extends into adjustment groove 57 so that the elements may be releasably fastened upon the adjustment annulus by bolts 62. The medial portion of slack adjuster connector arm 60 defines offset 63 to allow appropriate positioning of its two end portions and the radially outer end portion of the adjustment arm defines slot 64 to receive the body of the clevis pin 32 in a movable and adjustably interconnection. With this interconnecting structure, slack adjuster connector arm 60 may be adjustably interconnected to slack adjuster arm disk 54 at various radial positions, and when so interconnected will translate arcuate motion of clevis pin 32 into responsive rotary motion of slack adjuster arm disk 54.

Immediately inwardly of the slack adjuster arm disk 54 and proximal to the "S" cam, bearing surface 38 carries wave spring 65 and keeper ring 66 engaged in groove 67 defined in the radially outer peripheral surface of body 33 to maintain the annular sensor disk 41 and slack adjuster arm disk 54 in appropriate axial alignment on bearing surface 38 and yet allow the rotation of those two disks relative to each other and relative to the body 33.

The outer planar surface of slack adjuster arm disk 54 carries small permanent magnet 68 in a hole defined in its surface adjacent sensor disk 41. This magnet is radially positioned to rotate into coincidence with switch 44 carried by the sensor disk.

Figure 9:
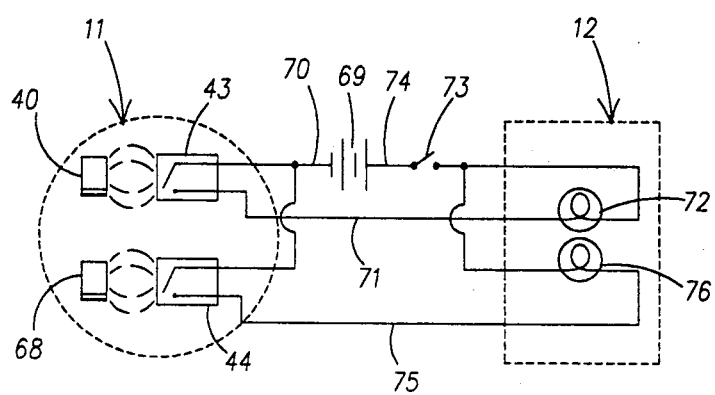
FIG. 9 is a diagrammatic representation of the face of an annunciator for use with our device and associated electrical circuitry shown in normal symbology.

Annunciator 12 is illustrated in diagrammatic form and normal symbology in FIG. 9. Switches 43, 44 communicate in parallel with power source 69 through line 70. Switch 43 then communicates through line 71 to annunciator 72, which in the instance illustrated is a light, to common battery return line 74. Switch 44 communicates in similar fashion through line 75 and annunciator 76 to brake system switch 73 and thence through line 74 to battery 69. With this annunciating system, a particular braking system may be selected by use of switch 73 and the condition of that system then displayed by means of annunciators 72, 76, or if desired switch 73 may be omitted to maintain the system on at all times. A plurality of such braking systems may have similar annunciating systems carried at one location for sequential or simultaneous display at that point, commonly in the cab of a truck or at a position spacedly distant from a truck.

The annunciating circuitry per se is not new or novel and various known sophisticated designs and elements may be added to the system to increase the utility of its use. Various types of audible or visual annunciators may be used in the system as desired. Electronic circuitry, and especially low voltage systems using diodes and thyristors, may be used to lock on any of the annunciators once activated until either manually reset or the happening of some other contingency. It is possible that the wire-type communication of components illustrated might be replaced with wireless type communications, such as radio signals or the like. These various annunciating concepts are known in their essence at least and their details do not constitute a part of our invention per se, though they are included within its scope.

Having thusly described the structure of our invention, its use may be understood.

Sensing and annunciating apparatus is created as specified and installed on an "S" cam type braking system as described. It is to be particularly noted that our system accommodates design and configurational variations and adjustments to permit the system to be installed on brake systems having somewhat variable parameters. "S" cam braking systems of the present day trucking arts are reasonably standardized and the adjustment limits allowed by our invention permit use on substantially all existing braking systems, and if not, our system may generally be readily reconfigured by known engineering methods to allow such use.

For installation, adjuster arm keeper ring 79 is removed and split ring clamp 36 is relaxed sufficiently to allow placement of the sensor body 33 upon the "S" cam shaft 20. Sensor body 33 is placed over the end portion 20b of the shaft 20, the split ring clamp 36 is moved over the inner end of the body and bolts 37 of the clamp are tightened to releasably fasten the body 33 on the "S" cam shaft. Holes are established in the peripheral flange of the housing of bearing 24 for bolts 53 and are threaded to accept those bolts. Fastening arm 52 is attached to bearing 24 by establishing bolts 53 between the two elements so that rod 50 is carried within channel 49 of yoke 47.

Slack adjuster connector arm 60 is positioned on adjustment annulus 56 by positionally establishing it and subsequently fastening it by bolt 62. Clevis pin 32 is removed from clevis 31, the outer end of adjustment arm 60 is manually positioned so that the clevis pin may be reinserted through slot 64, and the clevis pin is reinserted through that slot and through its normal channels in clevis 31 where it is again releasably fastened. In this condition, the sensing apparatus is operatively established on a particular brake system.

After sensing apparatus placement, electrical wiring of the annunciator system is established to allow placement of the annunciator as desired. Commonly all of a group of annunciators, or a single annunciator switched to sequentially display all sensor systems in a single vehicle, will be positioned at the same location, usually in a single unified display panel or box in a truck cab.

In operation, the rotary motion of the cam shaft past a predetermined initial point is measured by cam shaft measuring disk 35 and the amount of rotary motion of the cam shaft is measured by motion of slack adjuster arm disk 54, both disk motions being determined relative to annular sensor disk 41. In the braking system illustrated in FIG. 4, et seq., brake shoes 17 will be moved toward the inner surface of brake drum rim 15 when clevis 31, moves to the left in that illustration thus causing clockwise rotary motion in the "S" cam shaft. When our system is installed the angular relationship of cam shaft measuring disk 35 and slack adjuster arm disk 54 are determined relative to sensor disk 41. The two Hall switches 43, 44 carried by the sensor disk 45 are normally positioned in a vertically upward position, and this position is maintained throughout the installation process.

The magnet 40 carried by the cam shaft measuring disk 35 is established an angular distance clockwise from switch 43, the distance being that which is predetermined by ordinary engineering methods to indicate a wear of the braking system such as to require replacement of its parts. The components causing this wear will be predominantly the brake shoe elements and secondarily the surface of "S" cam 22 or "S" cam pins 19, or a combination of wear of all of these elements. The slack adjuster arm disk 54 will have its magnet 68 positioned at an angular distance clockwise from the inner Hall switch 44 as determined by the amount of slack or throw of clevis 31 that may be allowable within the limits of safety, again as determined by known and established engineering methods.

The setting of these parameters may be readily accomplished by firstly rotating the "S" cam to its neutral or "lowest roller" position, positioning the sensor device on an "S" cam shaft, fastening yoke 47 in appropriate angular position, and thereafter rotating cam shaft measuring disk 35 to its appropriate radial position before fastening split ring clamp 36. The slack adjuster arm disk 54 is then rotated to its appropriate radial position before fastening "U" shaped fastening clamp 61 upon that disk 54. Installation is aided by the magnetic switch 44 positioned at the switch "firing point" and then rotating the slack adjuster arm disk 54 in the appropriate angular amount before clamping slack adjuster connector arm 60 in operating position.

As the brake system operates and the rotation of the "S" cam shaft is sufficient to cause switch 44 to sense the presence of magnet 68 carried by the slack adjuster arm disk 57, that switch 44 will close and allow current to pass from power source 69 through line 70 and switch 44 and thence through annunciator 72 to activate that annunciator to indicate a dangerous wear condition and need to adjust the brake system. As repeated adjustments are made and the amount of angular motion of the "S" cam shaft 20 is great enough, magnet 40 carried by cam shaft measuring disk 35 will rotate into proximity with switch 43 to again close the electrical circuit through that switch and cause annunciator 76 to activate to indicate a need for replacement of brake shoes.

Normally brake system slack is adjusted by moving the angular position of slack adjuster arm 26 relative to "S" cam shaft 20 by releasing locking collar 30a, turning nut 30 to operate spiral worm 29 and rotating adjustment collar 27 relative to the slack adjuster arm.

The foregoing description of our invention is necessarily of a detailed nature so that a specific embodiment of its best mode of operation might be set forth as required, but it is to be understood that various modifications of detail, rearrangement and multiplication of parts might be resorted to without departing from its spirit essence or scope.

Having thusly described our invention, what we desire to protect by Letters Patent, and what we claim is:

1. In a braking system having opposed brake shoe arms pivotally movable into frictional engagement with the circumferential rim of a brake drum by means of an "S" cam carried for rotation on an "S" cam shaft having an end extending externally of the brake drum and activated by a radially extending adjustment arm having a clevis interconnecting driving linkage spacedly adjacent the "S" cam shaft, apparatus to sense and annunciate brake condition at a distance from the brake system, comprising in combination:

a cam shaft disk having an elongate sleeve-like sensor body with first and second ends defining a channel for carriage upon the splined end of the "S" cam shaft, said body defining a disk bearing surface and having clamping weans at the first end to releasably positionally maintain at least a first end portion of the body upon an "S" cam shaft, said body carrying an annular cam shaft disk at the second end, said cam shaft disk carrying a first switching means radially spaced from its bore;

an annular sensor disk journaled on the sleeve-like body of the cam shaft disk adjacent the cam shaft disk, said sensor disk carrying second and third switching means, respectively, on each side, said second switching means operatively communicating with the first switching means carried by the cam shaft disk, said sensor disk having adjustable mechanical linkage to maintain the sensor disk in fixed rotary position relative to the sleeve-like body carrying it;

an annular slack adjuster arm disk rotatably carried by the sleeve-like body of the cam shaft measuring disk adjacent the sensing disk and spacedly distant from the cam shaft disk, said slack adjuster arm disk having, forth switching, means in the surface adjacent the sensor disk to operatively communicate with the third switching means on the adjacent surface of the sensor disk, said slack adjuster arm disk having an adjustably positionable adjustment arm extending radially to communicate with an outer end portion of the slack adjuster arm to cause the slack adjuster arm disk to rotate responsively to the motion of the slack adjustment arm; and an annunciating system having at least two annunciators at a spaced distance from the brake system, a first annunciator communicating with the third switching means to annunciate the proximity of the fourth switching means carried by the slack adjuster arm disk with the third switching means proximate thereto to indicate need for brake slack adjustment and a second annunciator to annunciate proximity of the first switching means carried by the cam shaft disk to the second switching means to indicate parts wear.

2. The apparatus of claim 1 wherein the annunciating system is carried in the cab of a serviced truck and communicates with each of a plurality of brake systems associated with a serviced truck by electrically conductive wires, and the annunciating system annunciates need for brake adjustment and brake repair by means of visual indicia.

3. The invention of claim 1 further characterized by:
the end portion of the sleeve-like body distal from the cam shaft disk being carried on the end portion of the "S" cam shaft outwardly on that shaft from the communication of that shaft with an associated slack adjuster arm.

* * * * *